(12) United States Patent
Colombi et al.

(10) Patent No.: US 9,735,616 B2
(45) Date of Patent: Aug. 15, 2017

(54) SYSTEMS AND METHODS FOR PROVIDING INCREASED FAULT CURRENT CAPABILITY IN UNINTERRUPTIBLE POWER SUPPLY SYSTEMS

(71) Applicant: General Electric Company, Schenectady, NY (US)

(72) Inventors: Silvio Colombi, Losone (CH); Andrea Mannuccini, Locarno (CH); Harry Bye Handlin, Birmingham, AL (US)

(73) Assignee: General Electric Company, Schenectady, NY (US)

( * ) Notice: Subject to any disclaimer, the term of this patent is extended or adjusted under 35 U.S.C. 154(b) by 340 days.

(21) Appl. No.: 14/640,409

(22) Filed: Mar. 6, 2015

(65) Prior Publication Data
US 2015/0263568 A1   Sep. 17, 2015

Related U.S. Application Data

(60) Provisional application No. 61/952,543, filed on Mar. 13, 2014, provisional application No. 61/952,256, filed on Mar. 13, 2014.

(51) Int. Cl.
*H02J 9/00* (2006.01)
*H02J 9/06* (2006.01)
*H02J 3/48* (2006.01)

(52) U.S. Cl.
CPC ............... *H02J 9/061* (2013.01); *H02J 3/48* (2013.01); *H02J 9/062* (2013.01); *Y10T 307/615* (2015.04); *Y10T 307/62* (2015.04)

(58) Field of Classification Search
CPC ...... H02J 9/04; H02J 9/06; H02J 9/061; H02J 9/062; Y10T 307/615; Y10T 307/62
See application file for complete search history.

(56) References Cited

U.S. PATENT DOCUMENTS 3,750,004 A   7/1973  Walker
4,489,371 A   12/1984 Kernick
(Continued)

FOREIGN PATENT DOCUMENTS

CN   203104082 U   7/2013
WO   8808218 A1   10/1988

OTHER PUBLICATIONS

"Medium-Voltage Uninterruptible Power Supply for Mission-Critical Applications", PureWave® UPS XT System S & C Electric Company, pp. 1-8, Mar. 12, 2012.
(Continued)

*Primary Examiner* — Kenneth B Wells
(74) *Attorney, Agent, or Firm* — General Electric Company

(57) ABSTRACT

A system is provided. The system includes a ring bus, at least one voltage source, and a plurality of uninterruptible power supplies (UPSs) electrically coupled between the at least one voltage source and the ring bus, wherein at least one UPS of the plurality of UPSs includes an input, an output, a rectifier having a rectifier input and a rectifier output, an inverter having an inverter input and an inverter output, wherein the rectifier output is electrically coupled to the inverter input, and a bypass switch electrically coupled between the rectifier input and the inverter output, the bypass switch configured to close in response to detection of a fault on the ring bus.

20 Claims, 10 Drawing Sheets

(56) References Cited

U.S. PATENT DOCUMENTS

| | | | | |
|---|---|---|---|---|
| 5,075,565 | A * | 12/1991 | Severinsky | H02J 9/062 307/66 |
| 5,210,685 | A | 5/1993 | Rosa | |
| 5,237,208 | A * | 8/1993 | Tominaga | G05F 1/59 307/43 |
| 6,100,605 | A | 8/2000 | Zajkowski | |
| 6,191,500 | B1 | 2/2001 | Toy | |
| 6,292,379 | B1 * | 9/2001 | Edevold | H02J 3/38 307/66 |
| 6,295,215 | B1 * | 9/2001 | Faria | H02J 9/062 363/124 |
| 6,424,119 | B1 * | 7/2002 | Nelson | H02J 9/06 320/116 |
| 6,629,247 | B1 * | 9/2003 | Hall | H02J 9/06 307/66 |
| 6,657,320 | B1 | 12/2003 | Andrews et al. | |
| 7,105,949 | B2 * | 9/2006 | Wang | H02J 3/46 307/51 |
| 7,129,599 | B2 * | 10/2006 | Divan | H02J 3/006 307/65 |
| 7,265,458 | B2 * | 9/2007 | Edelen | H02J 9/06 307/65 |
| 7,425,779 | B2 | 9/2008 | Luo et al. | |
| 7,459,803 | B2 | 12/2008 | Mosman | |
| 7,566,990 | B2 * | 7/2009 | Loucks | H02J 9/08 307/64 |
| 7,649,758 | B2 * | 1/2010 | Taimela | H02J 9/062 363/132 |
| 7,701,087 | B2 * | 4/2010 | Eckroad | H02J 3/16 307/46 |
| 7,723,863 | B2 * | 5/2010 | Johnson, Jr. | H02J 9/062 307/23 |
| 7,737,580 | B2 * | 6/2010 | Hjort | H02J 7/0047 307/46 |
| 7,786,618 | B2 * | 8/2010 | Cohen | G06F 1/30 307/65 |
| 7,911,083 | B2 * | 3/2011 | Cohen | H02J 9/062 307/64 |
| 7,939,968 | B2 * | 5/2011 | Hjort | H02J 9/062 307/46 |
| 8,025,437 | B2 * | 9/2011 | Johnson, Jr. | G01K 13/00 327/512 |
| 8,115,339 | B2 * | 2/2012 | Jung | H02J 9/062 307/64 |
| 8,127,243 | B2 * | 2/2012 | Bakhreiba | G06F 1/30 715/777 |
| 8,212,401 | B2 * | 7/2012 | Linkhart | H02J 9/06 307/64 |
| 8,232,679 | B2 * | 7/2012 | Bobb | H02J 9/062 307/85 |
| 8,362,647 | B2 * | 1/2013 | Anderson | H02J 9/04 307/64 |
| 8,379,359 | B2 | 2/2013 | Klikic et al. | |
| 8,410,638 | B2 * | 4/2013 | Johnson, Jr. | H02J 3/26 307/105 |
| 8,446,039 | B2 * | 5/2013 | Ziegler | H02J 9/062 174/68.1 |
| 8,450,876 | B2 | 5/2013 | Rodenhiser et al. | |
| 8,493,696 | B2 | 7/2013 | Komatsuzaki | |
| 8,656,201 | B2 * | 2/2014 | Campesi | H02J 9/06 307/116 |
| 8,754,544 | B2 * | 6/2014 | Colombi | H02J 3/005 307/64 |
| 8,803,361 | B2 * | 8/2014 | Johansen | H02J 9/062 307/64 |
| 8,816,533 | B2 * | 8/2014 | Navarro | H02J 9/061 307/64 |
| 8,853,887 | B2 * | 10/2014 | Silberbauer | H02J 9/06 307/64 |
| 9,342,414 | B1 * | 5/2016 | Nguyen | G06F 11/2015 |
| 9,431,851 | B2 * | 8/2016 | Navarro | H02M 7/162 |
| 2006/0226706 | A1 | 10/2006 | Edelen et al. | |
| 2009/0322152 | A1 | 12/2009 | Jung et al. | |
| 2012/0013193 | A1 | 1/2012 | Sato et al. | |
| 2013/0069432 | A1 | 3/2013 | Beg et al. | |

OTHER PUBLICATIONS

European Search Report and Opinion issued in connection with corresponding EP Application No. 15158705.2 on Jul. 22, 2015.
Bekiarov et al., "Uninterruptible Power Supplies: Classification, Operation, Dynamics, and Control", Applied Power Electronics Conference and Exposition, 2002, IEEE, pp. 597-604, vol. 1.
Windhorn, "A Hybrid Static/Rotary UPS System", IEEE, pp. 541-545, vol. 28, Issue 3.

* cited by examiner

US 9,735,616 B2

SYSTEMS AND METHODS FOR PROVIDING INCREASED FAULT CURRENT CAPABILITY IN UNINTERRUPTIBLE POWER SUPPLY SYSTEMS

CROSS REFERENCE TO RELATED APPLICATIONS

This application is a non-provisional application and claims priority to U.S. Provisional Patent Application Ser. No. 61/952,543 filed Mar. 13, 2014 for "REDUNDANT UNINTERRUPTIBLE POWER SUPPLY SYSTEMS" and U.S. Provisional Patent Application Ser. No. 61/952,256 filed Mar. 13, 2014 for "REDUNDANT UNINTERRUPTIBLE POWER SUPPLY SYSTEMS", which are hereby incorporated by reference in their entirety.

BACKGROUND

The field of the invention relates generally to uninterruptible power supplies, and more particularly, to increasing fault current capability of uninterruptible power supplies in a ring bus architecture.

Robust power systems enable supplying power to one or more loads. Such power systems may include combinations of generation, transport, rectification, inversion and conversion of power to supply energy for electronic, optical, mechanical, and/or nuclear applications and loads. When implementing power systems and architectures, practical considerations include cost, size, reliability, and ease of implementation.

In at least some known power systems, one or more uninterruptible power supplies (UPSs) facilitate supplying power to a load. UPSs facilitate ensuring that power is continuously supplied to one or more critical loads, even when one or more components of a power system fail. Accordingly, UPSs provide a redundant power source. UPSs may be utilized in a number of applications (e.g., utility substations, industrial plants, marine systems, high security systems, hospitals, datacomm and telecomm centers, semiconductor manufacturing sites, nuclear power plants, etc.). Further, UPSs may be utilized in high, medium, or low power applications. For example, UPSs may be used in relatively small power systems (e.g., entertainment or consumer systems) or microsystems (e.g., a chip-based system).

BRIEF DESCRIPTION

In one aspect, a system is provided. The system includes a ring bus, at least one voltage source, and a plurality of uninterruptible power supplies (UPSs) electrically coupled between the at least one voltage source and the ring bus, wherein at least one UPS of the plurality of UPSs includes an input, an output, a rectifier having a rectifier input and a rectifier output, an inverter having an inverter input and an inverter output, wherein the rectifier output is electrically coupled to the inverter input, and a bypass switch electrically coupled between the rectifier input and the inverter output, the bypass switch configured to close in response to detection of a fault on the ring bus.

In another aspect, an uninterruptible power supply (UPS) for use in a ring bus system is provided. The UPS includes an input configured to be electrically coupled to a voltage source, an output configured to be electrically coupled to a ring bus, a rectifier comprising a rectifier input and a rectifier output, an inverter comprising an inverter input and an inverter output, wherein said rectifier output is electrically coupled to said inverter input, and a bypass switch electrically coupled between said rectifier input and said inverter output, said bypass switch configured to close in response to detection of a fault on said ring bus.

In yet another aspect, a method for generating fault current in a power system is provided. The power system includes a ring bus, at least one voltage source, and a plurality of uninterruptible power supplies (UPSs) electrically coupled between the at least one voltage source and the ring bus, wherein at least one UPS of the plurality of UPSs includes an input, an output, a rectifier comprising a rectifier input and a rectifier output, an inverter comprising an inverter input and an inverter output, wherein the rectifier output is electrically coupled to the inverter input, and a bypass switch electrically coupled between the rectifier input and the inverter output. The method includes detecting a fault on the ring bus, and closing the bypass switch in response to detecting the fault.

DETAILED DESCRIPTION

The systems and methods described herein facilitate increasing fault current capabilities of a UPS in a ring bus system. This allows for a reduced choke size in the ring bus system. The systems and methods described herein also provide at least some collateral advantages, including improvements realized regarding cost, feasibility, and in turn, viability of static UPS ring bus architectures.

Exemplary embodiments of an uninterruptible power supply system are described here. The plurality of uninterruptible power supplies are arranged in a ring bus configuration and configured to supply power to at least one load. One or more control devices are communicatively coupled to the plurality of uninterruptible power supplies. The control devices calculate an output voltage frequency for each of the plurality of uninterruptible power supplies, and control the uninterruptible power supplies such that each uninterruptible power supply operates at its respective calculated frequency to supply power to the at least one load. Notably, the frequencies of operation of various UPSs are different in transient conditions (e.g., following a variation of one or more loads). Once droop controls are in a steady state, however, all UPSs operate at the same frequency, but with a phase shift across associated chokes that equalize active power provided by each UPS. Droop controls, as described herein, determine instantaneous frequency and amplitudes of the output voltage of each UPS.

Figure 1:
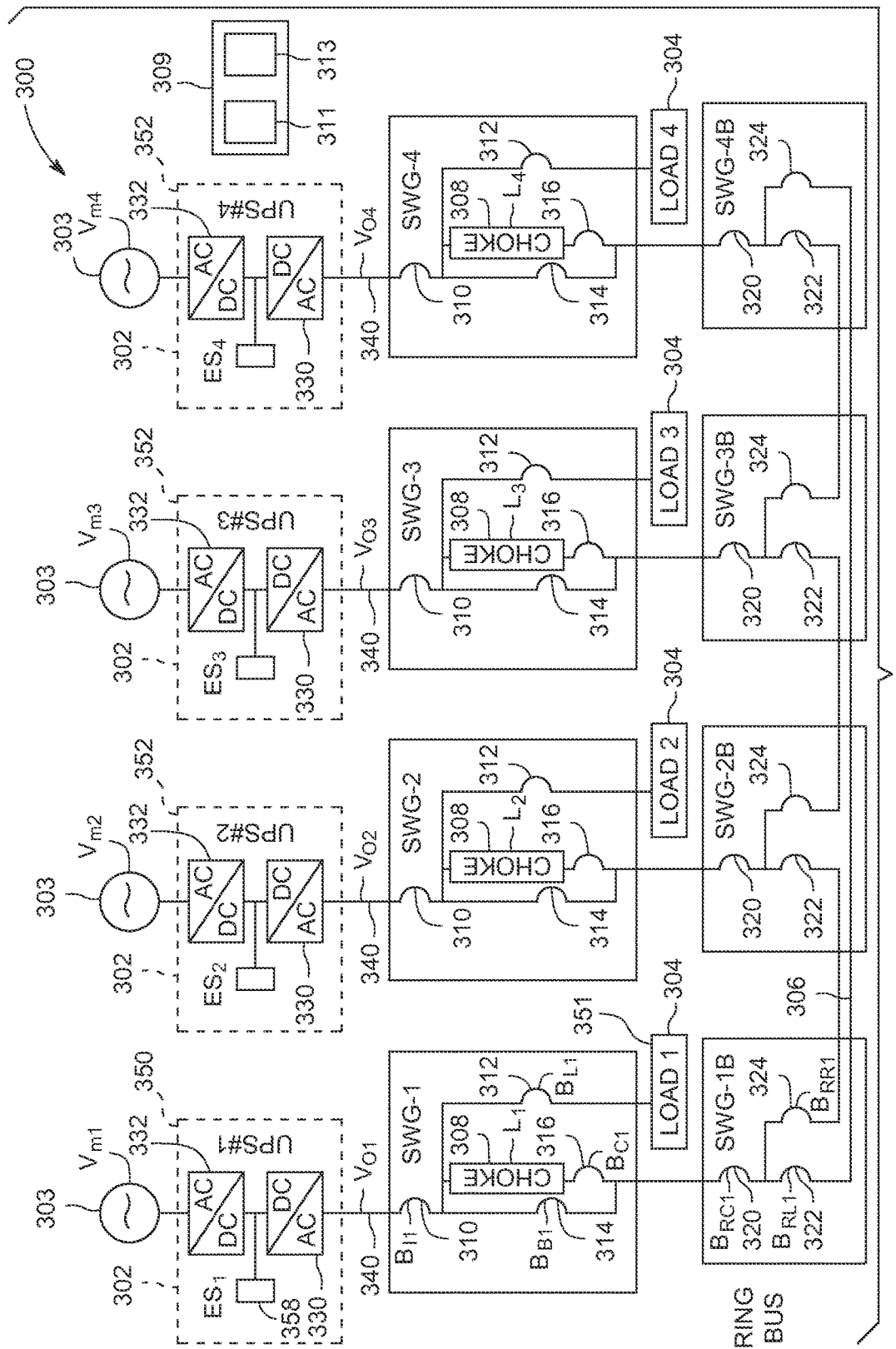
FIG. 1 is a schematic diagram of an exemplary ring bus architecture.

FIG. 1 is a schematic diagram of an exemplary redundant isolated-parallel (IP) uninterruptible power supply (UPS) ring bus architecture 300. In the exemplary embodiment, architecture 300 includes a plurality of UPSs 302 arranged in a ring architecture, or parallel architecture, as described herein. Specifically, architecture 300 includes four UPSs 302 in the exemplary embodiment. Alternatively, architecture 300 may include any number of UPSs 302 that enable architecture 300 to function as described herein. In the exemplary embodiment, architecture 300 is a three wire system. Alternatively, architecture 300 may be a four wire system (typically to supply loads that require a neutral wire).

In the exemplary embodiment, UPSs 302 are static double conversion UPSs (i.e., true on-line system systems). Both static and rotary UPSs may require droop control techniques for both voltage and frequency. In some cases, droop control for frequency alone may be sufficient. In some embodiments, droop control techniques are modified in order to handle non-linear loads.

Architecture 300 facilitates providing power to one or more loads 304. Under normal operation, one or more utilities function as a voltage source 303 and provide alternating current (AC) power to loads 304. Generators may also function as voltage sources 303. Notably, voltage sources 303 do not need to be synchronized in architecture 300. This is advantageous, as every UPS 302 may be fed by an individual generator and/or utility, and there is no need to add additional equipment to synchronize voltage sources 303.

In the event of a failure of voltage source 303 or of the UPS rectifier, UPS 302 utilizes energy storage devices 358 (e.g., batteries, flywheels, etc. with their converter) connected to UPSs 302 to keep power flowing to loads 304, as described herein. Further, if a given UPS 302 fails, loads 304 are fed power through a ring bus 306, as described herein. In the exemplary embodiment, architecture 300 includes four loads 304. Alternatively, architecture 300 may include any suitable number of loads 304 that enable architecture 300 to function as described herein.

In the exemplary embodiment, each UPS 302 is electrically coupled to an associated load 304, and coupled to ring bus 306 through an associated choke 308 (e.g., an inductor). In architecture 300, without proper synchronization, UPSs 302 cannot work properly due to undesirable circulation currents. Accordingly, in the exemplary embodiment, at least one controller 309 controls operation of UPSs 302. More specifically, at least one controller 309 controls a frequency of an output voltage of each UPS 302, as described herein. The frequency for each UPS 302 is calculated as a function of power, as described herein.

In some embodiments, architecture 300 includes a separate, dedicated controller 309 for each UPS 302. Alternatively, the system may include a single controller 309 that controls operation of all UPSs 302. Each controller 309 may include its own power system (not shown) such as a dedicated energy source (e.g., a battery). In some embodiments, each controller 309 is coupled to a substitute controller (not shown) that may be used in the event that controller 309 fails.

In the exemplary embodiment, each controller 309 is implemented by a processor 311 communicatively coupled to a memory device 313 for executing instructions. In some embodiments, executable instructions are stored in memory device 313. Alternatively, controller 309 may be implemented using any circuitry that enables controller 309 to control operation of UPSs 302 as described herein. For example, in some embodiments, controller 309 may include a state machine that learns or is pre-programmed to determine information relevant to which loads 304 require power.

In the exemplary embodiment, controller 309 performs one or more operations described herein by programming processor 311. For example, processor 311 may be programmed by encoding an operation as one or more executable instructions and by providing the executable instructions in memory device 313. Processor 311 may include one or more processing units (e.g., in a multi-core configuration). Further, processor 311 may be implemented using one or more heterogeneous processor systems in which a main processor is present with secondary processors on a single chip. As another illustrative example, processor 311 may be a symmetric multi-processor system containing multiple processors of the same type. Further, processor 311 may be implemented using any suitable programmable circuit including one or more systems and microcontrollers, microprocessors, reduced instruction set circuits (RISC), application specific integrated circuits (ASIC), programmable logic circuits, field programmable gate arrays (FPGA), and any other circuit capable of executing the functions described herein. In the exemplary embodiment, processor 311 causes controller 309 to operate UPSs 302, as described herein.

In the exemplary embodiment, memory device 313 is one or more devices that enable information such as executable instructions and/or other data to be stored and retrieved. Memory device 313 may include one or more computer readable media, such as, without limitation, dynamic random access memory (DRAM), static random access memory (SRAM), a solid state disk, and/or a hard disk. Memory device 313 may be configured to store, without limitation, application source code, application object code, source code portions of interest, object code portions of interest, configuration data, execution events and/or any other type of data.

In the exemplary embodiment, as described in more detail below, one or more controllers 309, and more specifically processor 311, calculates an output voltage frequency for each UPS 302, and one or more controllers 309 operate each UPS 302 at the calculated frequency. Operating each UPS 302 at their respective calculated frequencies as determined by the droop controls makes it possible to achieve load sharing and stability in architecture 300. The frequencies of operation across the various UPSs 302 are different in transient conditions (e.g., following a variation of one or more loads 304). Once the droop controls are in steady state, all UPSs 302 operate at the same frequency but with a phase shift across chokes 308 that equalizes the active power provided by each UPS 302.

In architecture 300, each UPS 302 is able to supply power to an associated local load 304, as well as transfer active and reactive power to ring bus 306 through an associated choke 308. In the exemplary embodiment, architecture 300 facilitates sharing local loads 304 equally between UPSs 302 without any communication using droop controls, and in particular, frequency versus active power and voltage versus reactive power. This removes limitations on the number of UPSs 302 in architecture 300.

In the exemplary embodiment, architecture 300 includes a number of circuit breakers. Specifically, for each UPS 302, a first circuit breaker 310 is electrically coupled between UPS 302 and choke 308, a second circuit breaker 312 is electrically coupled between first circuit breaker 310 and local load 304, a third circuit breaker 314 is electrically coupled between first circuit breaker 310 and ring bus 306, and a fourth circuit breaker 316 is coupled between choke 308 and ring bus 306. Further, at ring bus 306, a central circuit breaker 320, a left circuit breaker 322, and a right circuit breaker 324 are associated with each UPS 302, and facilitate isolating UPS 302 from ring bus 306 and/or other UPSs 302 on ring bus 306. Each circuit breaker 310, 312, 314, 316, 320, 322, and 324 includes associated logic and relays (neither shown) for operation. The protection scheme provided by circuit breakers 310, 312, 314, 316, 320, 322, and 324 facilitates locating faults in architecture 300 and isolating those faults by opening the appropriate breakers. Further, third circuit breakers 314, also referred to as bypass breakers, facilitate bypassing choke 308 when the associated UPS 302 fails or is under maintenance. This facilitates improving the quality of the voltage on the associated local load 304 as the voltage drop on choke 308 is removed.

For ring bus applications, chokes 308 are sized to sustain a bolted fault on ring bus 306 for a long enough time to guarantee isolation of the fault through the activation of the specific breakers in architecture 300. Further, for situations where a breaker fails to open, additional time should be built-in to determine and execute an alternative fault isolation strategy. Accordingly, to facilitate maximizing a duration of time where the inverter in an associated UPS 302 can sustain a bolted fault on ring bus 306, chokes 308 may be sized to operate the inverter in a linear mode under a short circuit on ring bus 306. The systems and methods described herein facilitate increasing fault current capability of UPSs 302 in the event of a fault.

As shown in FIG. 1, each UPS 302 includes an inverter 330 and a rectifier 332. Different designs are possible for inverters 330. For example, for transformerless designs, FIG. 2 is a circuit diagram of an exemplary single phase voltage source two level inverter 400, and FIG. 3 is a circuit diagram of an exemplary single phase voltage source three level inverter 500.

Figure 2:
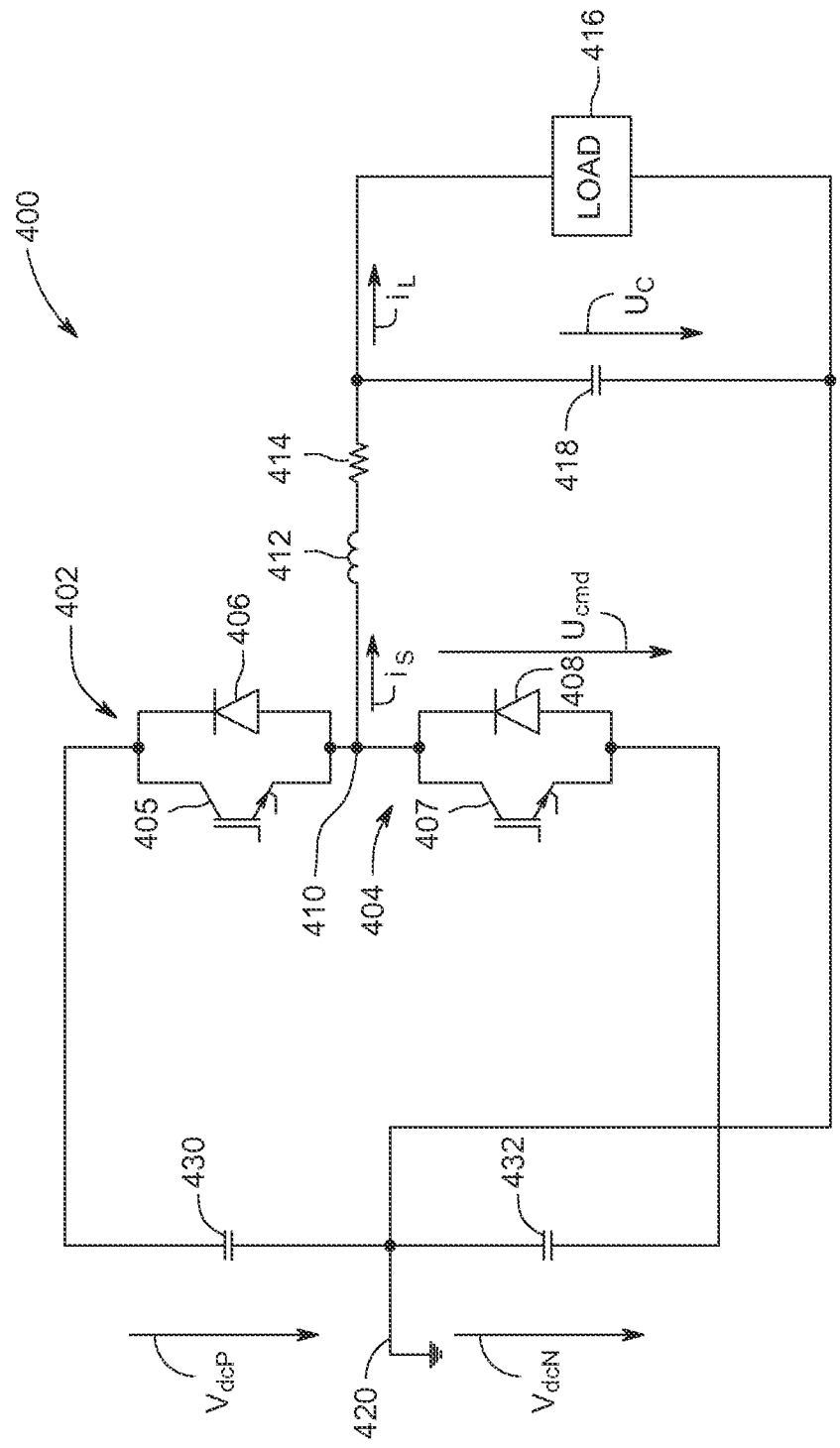
FIG. 2 is a circuit diagram of an exemplary single phase voltage source two level inverter.
Figure 3:
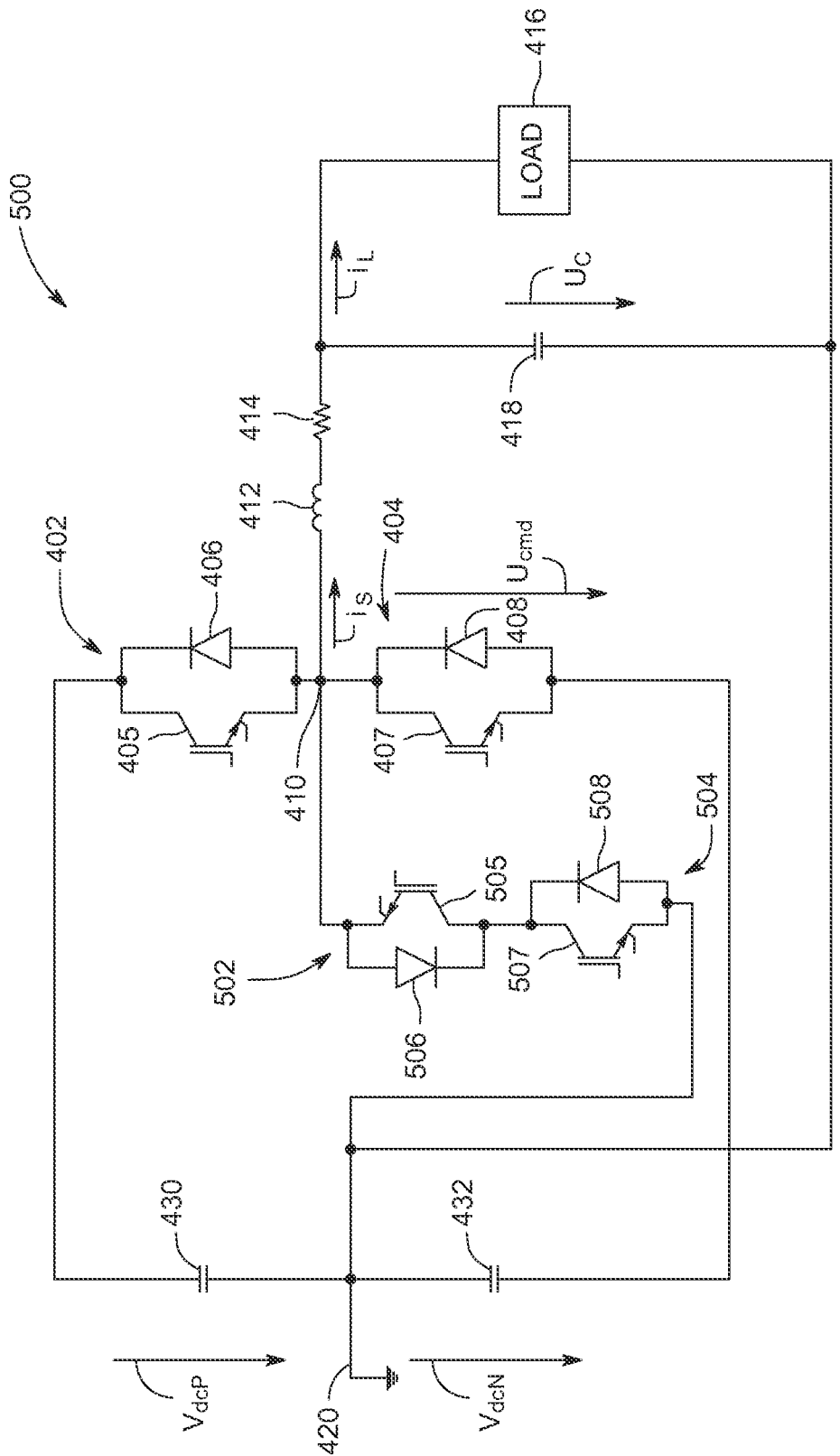
FIG. 3 is a circuit diagram of an exemplary single phase voltage source three level inverter.

As shown in FIG. 2, inverter 400 includes a first switching device 402 and a second switching device 404. First switching device 402 includes a first switch 405 (e.g., a transistor) electrically coupled in parallel with a first diode 406, and second switching device 404 includes a second switch 407 (e.g., a transistor) electrically coupled in parallel with a second diode 408. A voltage across the lower, or second switching device 404 is referred to herein as a command voltage, $u_{cmd}$. A node 410 between first and second switching devices 402 and 404 outputs a bridge current, $i_s$, through an inductor 412 and a resistor 414. Bridge current $i_s$ splits into a load current, $i_L$, that flows to load 416 (such as local load 304) and a current that flows through a capacitor 418. The total load current is the sum of load current $i_L$ and a potential fault current. A voltage across capacitor 418 is referred to as a capacitor voltage, $u_c$. Inverter 400 includes a first DC capacitor 430 electrically coupled between first switching device 402 and neutral 420, and a second DC capacitor 432 electrically coupled between second switching device 404 and neutral 420. The voltage across first DC capacitor 430 is an upper DC link voltage, $V_{dcp}$, and the voltage across second DC capacitor 432 is a lower DC link voltage, $V_{dcN}$.

Unless indicated otherwise, inverter 500 is substantially similar to inverter 400. As shown in FIG. 3, inverter 500 includes a third switching device 502 and a fourth switching device 504 electrically coupled in series between node 410 and neutral 420. Third switching device 502 includes a third switch 505 (e.g., a transistor) electrically coupled in parallel with a third diode 506, and fourth switching device 504 includes a fourth switch 507 (e.g., a transistor) electrically coupled in parallel with a fourth diode 508. Third and fourth switching devices 502 and 504 implement a bi-directional switching device. Alternatively, the bi-directional switching device may be implemented using other components (e.g., using reverse blocking devices). The topologies of inverter 400 and inverter 500 may be implemented as three phase converters by using three legs.

Figure 4:
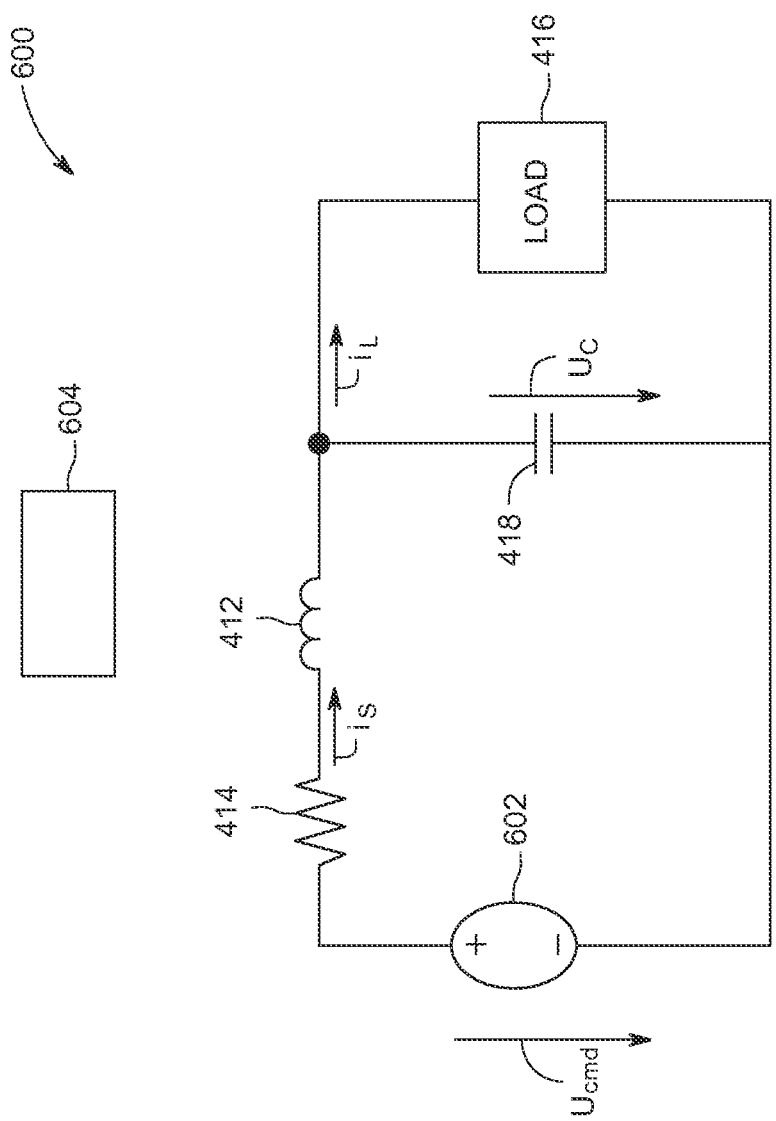
FIG. 4 is a simplified circuit diagram of a single phase inverter.

For both inverter 400 and inverter 500, FIG. 4 is a circuit diagram of the equivalent circuit 600 of a single phase inverter. Circuit 600 includes the command voltage $u_{cmd}$ represented as a voltage source 602. The discontinuous command voltage $u_{cmd}$ models the two or three level inverter. Hence, this voltage may have square wave variations between two or three possible values. In the exemplary embodiment, a controller 604, such as controller 309 (shown in FIG. 1), controls operation of one or more components of circuit 600.

Referring back to FIG. 1, to facilitate maximizing a duration of time where an inverter 330 in an associated UPS 302 can sustain a bolted fault on ring bus 306, chokes 308 are typically sized to operate inverter 330 in a linear mode under a short circuit on ring bus 306.

Figure 5:
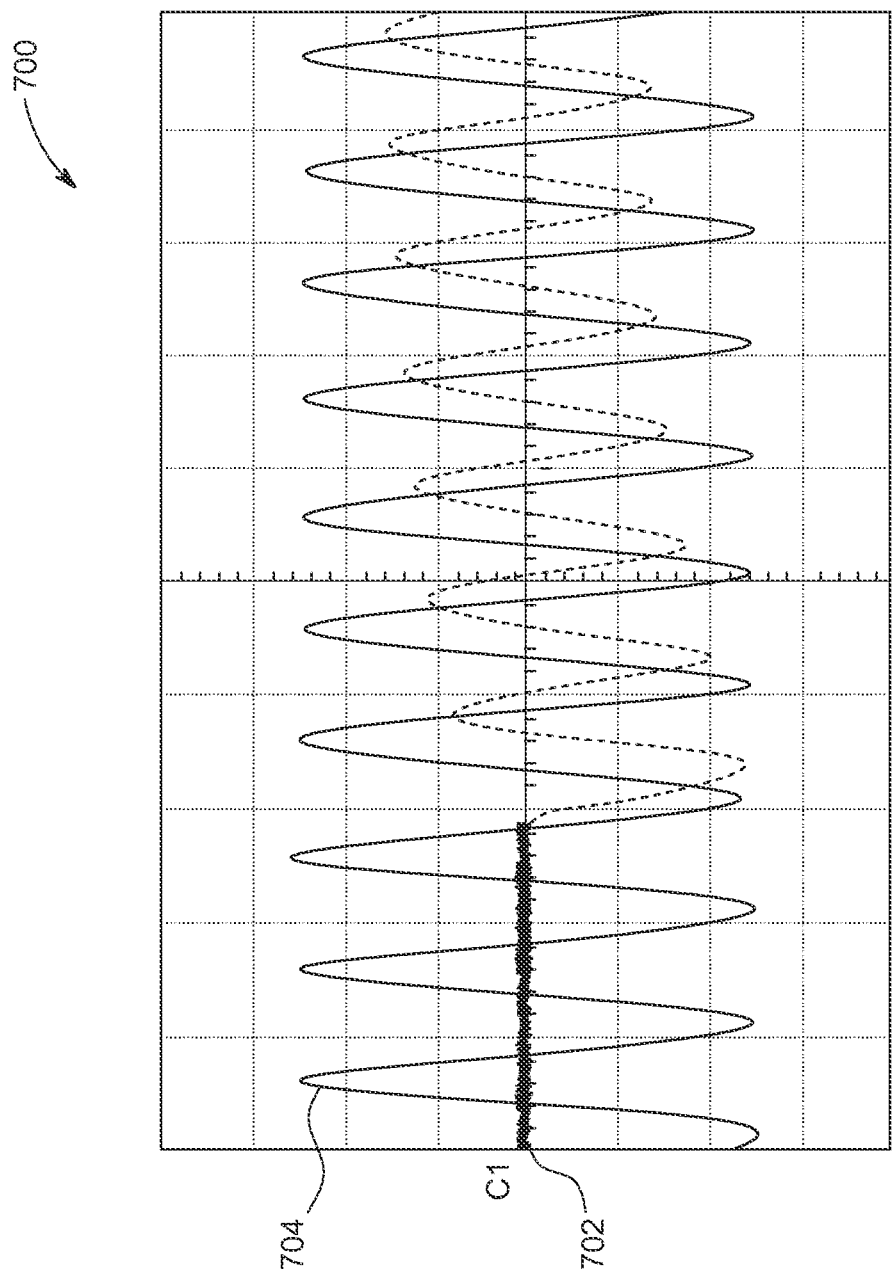
FIG. 5 is a graph illustrating behavior of a fault current.

FIG. 5 is a graph 700 illustrating behavior of a fault current. Graph 700 includes an inductive fault current curve 702 and a voltage curve 704 plotted over time during a bolted fault on ring bus 306. As shown in FIG. 5, depending on a phase angle of the short circuit on ring bus 306, an inductive fault current through choke 308 can include a relatively large DC component (see, e.g., the initial dip in inductive fault current curve 702). This DC component decays over time to "re-center" with an L/R time constant of choke 308. As shown in FIG. 5, inductive fault current curve 702 re-centers relatively slowly. Accordingly, a transient peak fault current may reach twice a steady state fault current (see, e.g., the initial dip in inductive fault current curve 702).

To keep inverter 330 of UPS 302 operating in a linear mode of operation, one approach is to increase (e.g., double) the size of chokes 308. This may be impractical, as static UPSs may have a limited fault current capability that may demand a relatively large choke.

Another approach is to provide increased fault current capability. Specifically, by increasing the amount of fault current injected through an associated choke 308, the size of choke 308 may be reduced. The embodiments described herein provide systems and methods for increasing the amount of fault current.

Figure 6:
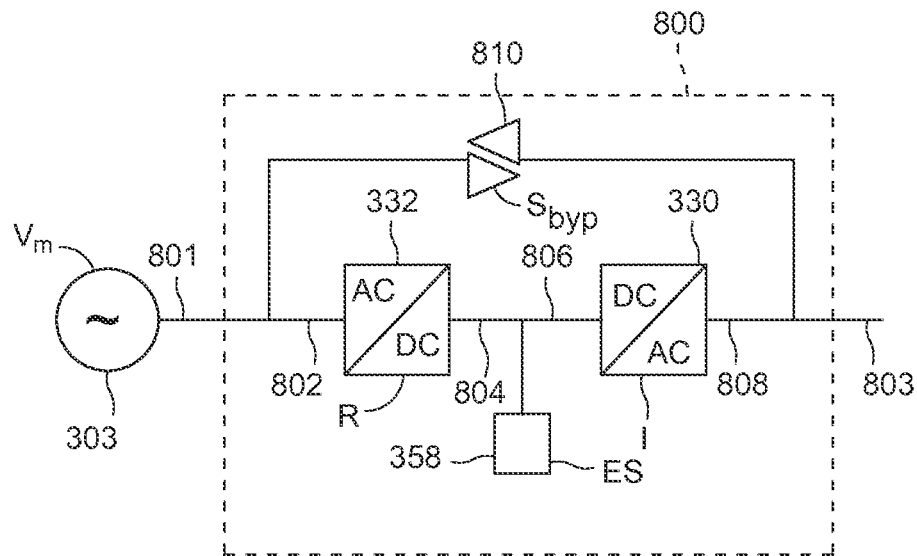
FIG. 6 is a schematic diagram of an exemplary UPS coupled to a voltage source.

FIG. 6 is a schematic diagram of a UPS 800, such as UPS 302 (shown in FIG. 1) coupled to a voltage source 303. UPS 800 includes an input 801, an output 803, a rectifier 332, an inverter 330, and an energy storage device 358. Rectifier 332 includes a rectifier input 802 and a rectifier output 804, and inverter 330 includes an inverter input 806 and an inverter output 808. Energy storage device 358 is coupled between rectifier output 804 and inverter input 806.

In the exemplary embodiment shown in FIG. 6, UPS 800 includes a bypass switch 810 electrically coupled between rectifier input 802 and inverter output 808. Bypass switch 810 facilitates increasing a fault current capability of UPS 800, as described herein. Notably, the embodiment of FIG. 6 is applicable when all UPSs 302 in architecture 300 share a common utility (i.e., the voltage source 303 associated with each UPS 302 is the same voltage source 303).

Under normal operation (i.e., in the absence of a fault), bypass switch 810 is open. However, when a fault is detected, bypass switch 810 is closed such that power flows from voltage source 303 through bypass switch 810, bypassing inverter 330 and rectifier 332 to provide increased fault current. The fault may be detected by controller 309, and controller 309 may control whether bypass switch 810 is open or closed (e.g., by sending a bypass command or signal to UPS 800). For example, controller 309 may compare phased voltages to ground to detect a fault in system 300.

When a frequency difference between an operating frequency of voltage source 303 and an output voltage frequency of inverter 330 is relatively large, bypassing inverter 330 and rectifier 332 may be problematic. Accordingly, in the exemplary embodiment, a modified droop control is used to share power between loads 304 while bringing, relatively slowly, the output voltage frequency of inverter 330 back to the operating frequency of common voltage source 303. This is possible because a transfer of active power through chokes 308 is proportional to a phase shift between voltages before and after chokes 308. In such a scenario, the phase of inverter 330 will be relatively close to the phase of common voltage source 303. Accordingly, when a common utility is available, bypass switch 810 may be utilized to provide increased fault current capability.

Figure 7:
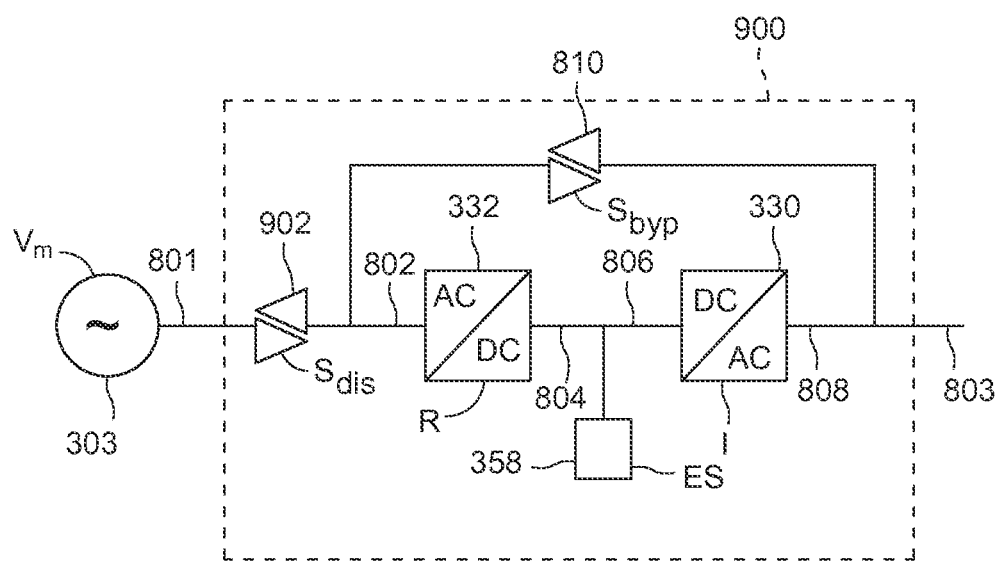
FIG. 7 is a schematic diagram of an exemplary UPS including a disconnect switch and coupled to a voltage source.

FIG. 7 is a schematic diagram of a UPS 900 coupled to a voltage source 303. UPS 900 may be utilized to provide increased fault current capability when a common utility is not available or when no utility is available (e.g., during battery operation). Unless otherwise indicated, UPS 900 includes the same components as UPS 800 (shown in FIG. 6). As shown in FIG. 6, in contrast to UPS 800, UPS 900 includes a disconnect switch 902 electrically coupled between rectifier input 802 and voltage source 303. That is, disconnect switch 902 is electrically coupled between UPS input 801 and rectifier input 802. For the embodiment of FIG. 7, each UPS 302 in system 300 should be implemented using the configuration of UPS 800.

Under normal operation (i.e., in the absence of a fault), in UPS 800, bypass switch 810 is open and disconnect switch 902 is closed. When a fault is detected, disconnect switch 902 is opened, and bypass switch 810 is closed to provide increased fault current. Specifically, by opening disconnect switch 902 and closing bypass switch 810, voltage source 303 is disconnected from UPS 800 and rectifier 332 provides additional fault current capability, as described herein. The additional reactive current and power provided by rectifier 332 sustains a voltage on an associated load 304.

Disconnect switch 902 and bypass switch 810 may be any type of switching device, including, but not limited to, static switches, mechanical switches, and electromechanical switches. To facilitate rapidly disconnecting UPS 800 from voltage source 303, disconnect switch 902 should be a relatively fast switching device. For example, disconnect switch 902 may be an insulated-gate bipolar transistor (IGBT) switch or an integrated gate-commutated thyristor (IGCT) switch.

Figure 8:
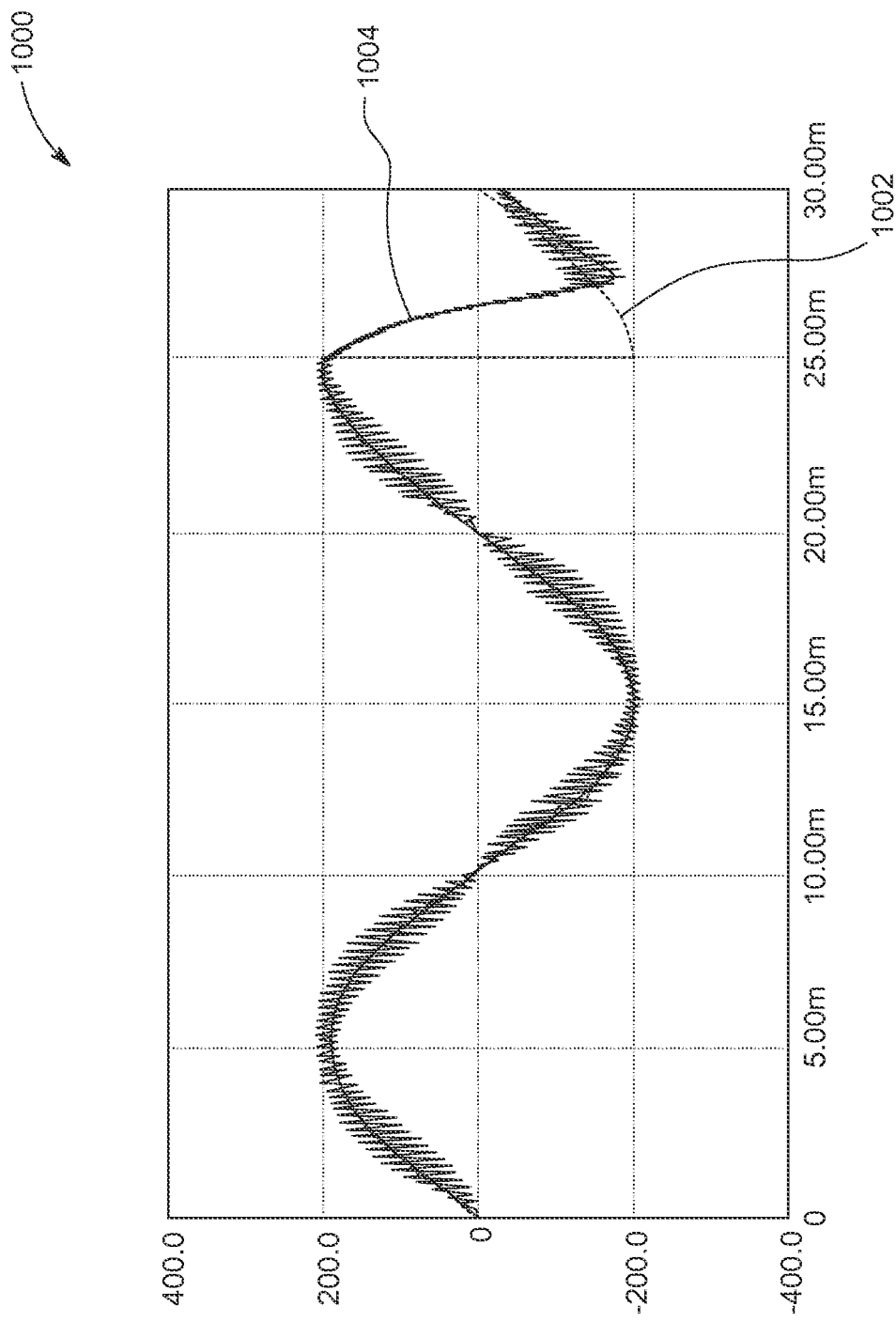
FIG. 8 is a graph illustrating performance of a rectifier of the UPS shown in FIG. 7.

In some embodiments, disconnect switch 902 includes one or more thyristors. Thyristors do not switch off instantaneously, but switch off only when current through the thyristor crosses zero. Accordingly, to facilitate opening disconnect switch 902, in such embodiments, when controller 309 commands disconnect switch 902 to open (e.g., by sending a disconnect command or signal to UPS 900), controller 309 also inverts a reference current for rectifier 332. This essentially commands rectifier 332 to inject power into the grid, but also causes the current at rectifier input 802 (and at disconnect switch 902) to cross zero relatively quickly, causing the one or more thyristors to open. FIG. 8 is a graph 1000 illustrating performance of a single-phase rectifier where a sign of a reference current 1002 is changed at 25 milliseconds (ms). As shown in FIG. 7, once reference current 1002 changes signs, a rectifier current 1004 crosses zero approximately 1.7 ms later.

Figure 9A:
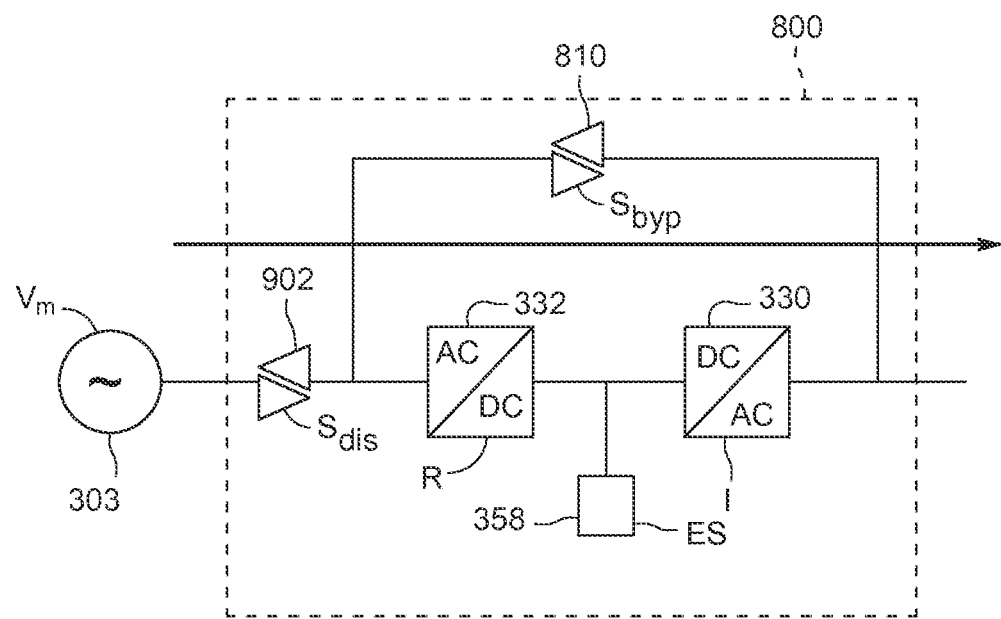
FIGS. 9A-9C are schematic diagrams illustrating operation of the UPS shown in FIG. 7.
Figure 9B:
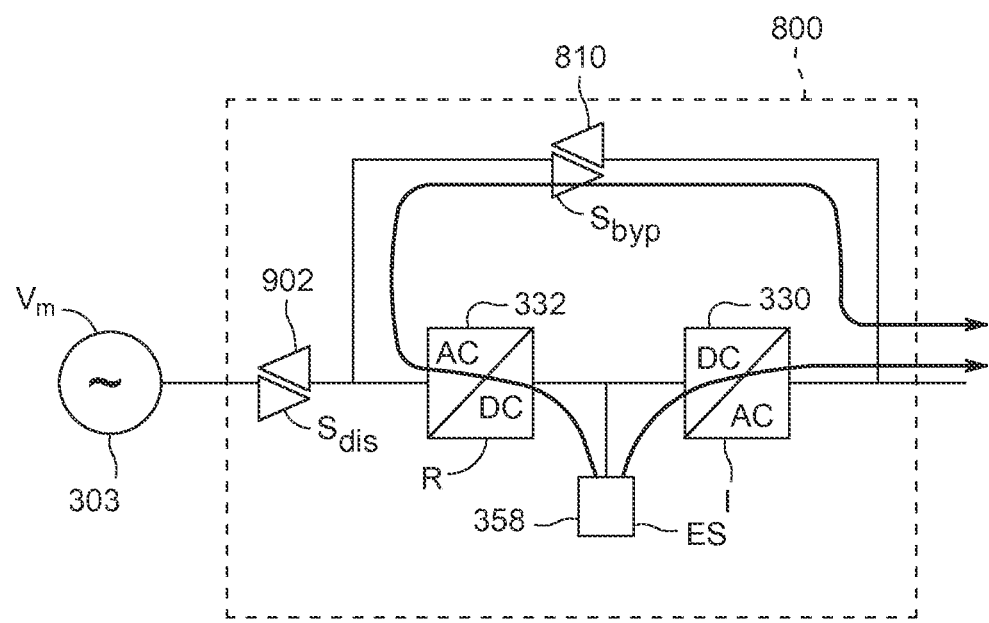
Figure 9C:
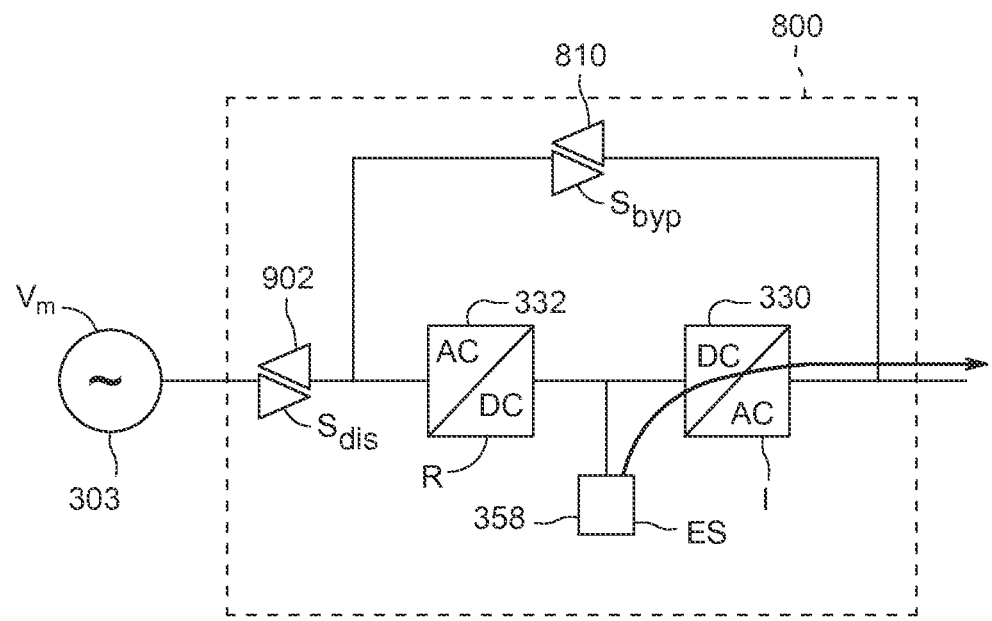

FIGS. 9A-9C are schematic diagrams illustrating operation of UPS 800. During normal operation (i.e., in the absence of a fault), as shown in FIG. 9A, disconnect switch 902 is closed and bypass switch 810 is open, and power from voltage source 303 is converted by rectifier 332 and inverter 330 before being channeled to an associated load 304. Using droop controls, loads 304 in system 300 are shared equally without communication between UPSs 302. During normal operation, ring bus 306 is monitored to detect faults, and in particular, phase to phase or phase to ground short circuits. As described above, once a fault is detected, disconnect switch 902 is commanded to open, and if disconnect switch 902 is implemented using thyristors, the sign of the reference current for rectifier 332 is changed.

At this point, bypass switch 810 is closed, and rectifier 332 provides additional fault current, as shown in FIG. 9B. Notably, both inverter 330 and rectifier 332 provide fault current to the associated choke 308. When the fault has been located and isolated (e.g., by opening appropriate circuit breakers 310, 312, 314, 316, 320, 322, and 324), bypass switch 810 is opened. At this point, as shown in FIG. 9C, inverter 330 is fed by energy storage device 358. Then, disconnect switch 902 is closed and rectifier 332 is ramped up until inverter 330 is again fed by power from rectifier 332. In one embodiment, assuming a fault occurs at time t=0 ms, at t≈0.3 ms the fault is detected, disconnect switch 902 is commanded to open, and the sign of the rectifier reference current is changed, at t≈2.0 ms disconnect switch 902 actually opens, bypass switch 810 is commanded to close, and rectifier 322 injects current into the associated choke 308, and at t≈50 ms the fault is isolated by opening the appropriate circuit breakers 310, 312, 314, 316, 320, 322, and 324.

As shown in FIG. 9B, when a fault occurs, rectifier 332 provides additional fault current. Accordingly, the equivalent of circuit 600 (shown in FIG. 4) when additional fault current is provided is shown as circuit 1100 in FIG. 10. Specifically, rectifier 332 acts as a current source 1102 that provides an additional current $i_R$. An inductance 1104 represents the associated choke 308.

Figure 10:
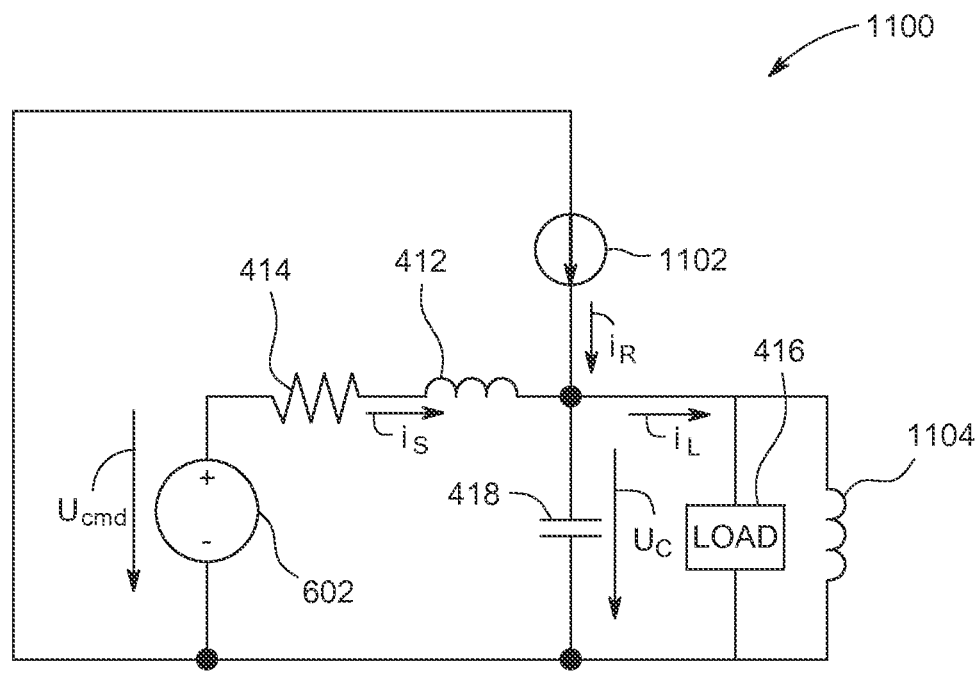
FIG. 10 is a circuit diagram of the UPS shown in FIG. 7.
Figure 11:
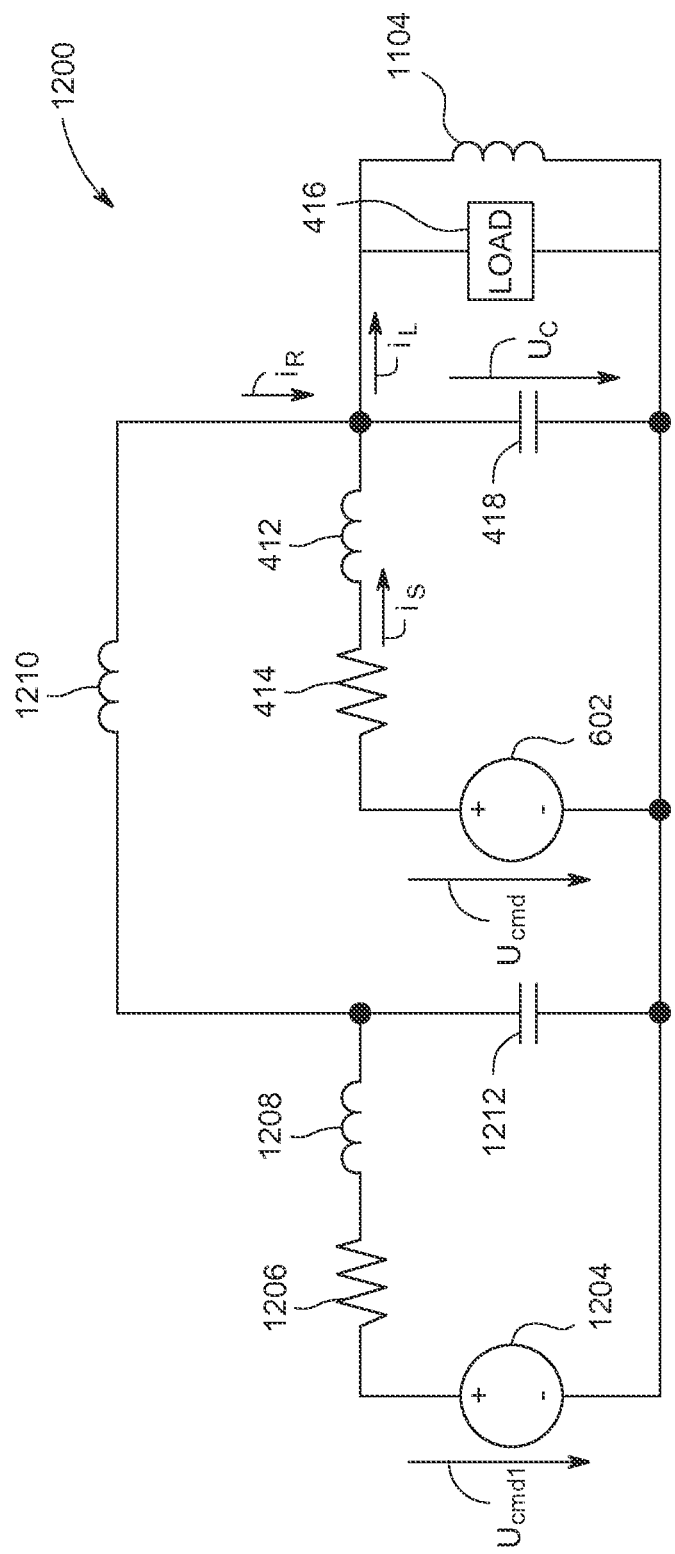
FIG. 11 is a circuit diagram of the UPS shown in FIG. 7.

FIG. 11 is a schematic diagram of a circuit 1200 that is a more detailed representation of circuit 1100 (shown in FIG. 10). In particular, circuit 1200 corresponds to a single phase equivalent of UPS inverter 330 with an additional UPS rectifier 332 operating as a current source to feed an associated load 304 and choke 308. As discussed above, rectifier 332 provides an additional current $i_R$ in the event of a fault on ring bus 306. In circuit 1200, rectifier 332 is represented by an additional command voltage $u_{cmd1}$ represented as a voltage source 1204, a resistor 1206, a first inductor 1208, a second inductor 1210, and a capacitor 1212.

The control of circuit 1200 may be realized in multiple ways. In one embodiment, a cascade control scheme is implemented. For example, a controller, such as controller 309, controls a voltage $u_c$ across capacitor 418 to follow a reference voltage $u_{ref}$, and determines a total reference current $i_{rtref}$. This total reference current is split into two equal parts to form reference currents $i_{Rref}$ and $i_{sref}$ for two inner current controls. The first current control determines the additional command voltage $u_{emd1}$ in order for the current $i_R$ to follow the reference current $i_{Rref}$. The second current control determines the command voltage $u_{cmd}$ in order for the current $i_s$ to follow the reference current $i_{sref}$.

Those of skill in the art will appreciate that other controls strategies may also be implemented.

As compared to at least some known power systems, the systems and methods described herein facilitate increasing the fault current capability of UPSs in a ring bus system. In the event of a fault, by injecting additional fault current though an associated choke, the size of the choke may be reduced, while still achieving a desired voltage at an associated load. Reducing choke size facilitates improving cost, feasibility, and viability of ring bus systems relative to at least some known power systems.

Notably, the systems and methods described herein are applicable independent of voltage level, and more particularly, are applicable to both low voltage (LV) (e.g., 480V phase-phase) and medium voltage (MV) (e.g., 13.8 kV phase-phase) applications.

Exemplary embodiments of systems and methods for uninterruptible power supplies are described above in detail. The systems and methods are not limited to the specific embodiments described herein but, rather, components of the systems and/or operations of the methods may be utilized independently and separately from other components and/or operations described herein. Further, the described components and/or operations may also be defined in, or used in combination with, other systems, methods, and/or devices, and are not limited to practice with only the systems described herein.

The order of execution or performance of the operations in the embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system comprising:
   a ring bus;
   at least one voltage source; and
   a plurality of uninterruptible power supplies (UPSs) electrically coupled between said at least one voltage source and said ring bus, wherein at least one UPS of said plurality of UPSs comprises:
   an input;
   an output;
   a rectifier comprising a rectifier input and a rectifier output;
   an inverter comprising an inverter input and an inverter output, wherein said rectifier output is electrically coupled to said inverter input; and
   a bypass switch electrically coupled between said rectifier input and said inverter output, said bypass switch configured to close in response to detection of a fault on said ring bus.

2. A system in accordance with claim 1, further comprising a controller communicatively coupled to said at least one UPS and configured to:
   detect the fault; and
   command the bypass switch to close upon detection of the fault.

3. A system in accordance with claim 2, wherein said at least one UPS further comprises a disconnect switch electrically coupled between said UPS input and said rectifier input, said disconnect switch configured to open in response to the detection of the fault.

4. A system in accordance with claim 3, wherein said controller is further configured to command the disconnect switch to open upon detection of the fault.

5. A system in accordance with claim 4, wherein said disconnect switch comprises a thyristor.

6. A system in accordance with claim 5, wherein said controller is further configured to change a sign of a reference voltage for said rectifier upon detection of the fault.

7. A system in accordance with claim 3, wherein said disconnect switch comprises one of an insulated-gate bipolar transistor switch and an integrated gate-commutated thyristor switch.

8. An uninterruptible power supply (UPS) for use in a ring bus system, said UPS comprising:
   an input configured to be electrically coupled to a voltage source;
   an output configured to be electrically coupled to a ring bus;
   a rectifier comprising a rectifier input and a rectifier output;
   an inverter comprising an inverter input and an inverter output, wherein said rectifier output is electrically coupled to said inverter input; and
   a bypass switch electrically coupled between said rectifier input and said inverter output, said bypass switch configured to close in response to detection of a fault on the ring bus.

9. A UPS in accordance with claim 8, wherein said bypass switch is configured to close in response to a bypass command received from a controller that detects the fault.

10. A UPS in accordance with claim 9, said UPS further comprising a disconnect switch electrically coupled between said UPS input and said rectifier input, said disconnect switch configured to open in response to the detection of the fault.

11. A UPS in accordance with claim 10, wherein said disconnect switch is configured to open in response to a disconnect command received from the controller.

12. A UPS in accordance with claim 11, wherein said disconnect switch comprises a thyristor.

13. A UPS in accordance with claim 11, wherein said disconnect switch comprises one of an insulated-gate bipolar transistor switch and an integrated gate-commutated thyristor switch.

14. A method for generating fault current in a power system that includes a ring bus, at least one voltage source, and a plurality of uninterruptible power supplies (UPSs) electrically coupled between the at least one voltage source and the ring bus, wherein at least one UPS of the plurality of UPSs includes an input, an output, a rectifier comprising a rectifier input and a rectifier output, an inverter comprising an inverter input and an inverter output, wherein the rectifier output is electrically coupled to the inverter input, and a bypass switch electrically coupled between the rectifier input and the inverter output, said method comprising:

detecting a fault on the ring bus; and closing the bypass switch in response to detecting the fault.

15. A method in accordance with claim 14, wherein detecting the fault comprises detecting the fault using a controller communicatively coupled to the at least one UPS.

16. A method in accordance with claim 15, wherein closing the bypass switch comprises sending a bypass command from the controller to the at least one UPS.

17. A method in accordance with claim 16, further comprising opening, in response to detecting the fault, a disconnect switch electrically coupled between the UPS input and the rectifier input.

18. A method in accordance with claim 17, wherein opening the disconnect switch comprises opening a disconnect switch including a thyristor.

19. A method in accordance with claim 18, further comprising changing, in response to detecting the fault, a sign of a reference voltage for the rectifier.

20. A method in accordance with claim 17, wherein opening the disconnect switch comprises opening the disconnect switch including one of an insulated-gate bipolar transistor switch and an integrated gate-commutated thyristor switch.

\* \* \* \* \*